United States Patent [19]

Satoh et al.

[11] 4,231,673

[45] Nov. 4, 1980

[54] BALL JOINT AND A METHOD FOR MANUFACTURING THE BALL JOINT

[75] Inventors: Eiji Satoh, Fujisawa; Masayuki Kohama, Shiga; Kunihiko Yokoya; Kenji Yamada, both of Yokohama; Akira Nemoto, Toyohashi, all of Japan

[73] Assignees: Oiles Industries Co., Ltd., Tokyo; Musashi Seimitsu Kogyo Kabushiki Kaisha, Aichi, both of Japan

[21] Appl. No.: 970,170

[22] Filed: Dec. 18, 1978

[30] Foreign Application Priority Data

Dec. 28, 1977 [JP] Japan ................... 52/158456
Dec. 28, 1977 [JP] Japan ................... 52/158457

[51] Int. Cl.$^2$ ............................................. F16C 11/06
[52] U.S. Cl. ...................................... 403/125; 403/135
[58] Field of Search ............... 403/135, 138, 139, 140, 403/132, 133, 124, 125, 126; 29/149.5 B, 149.5 C, 149.5 DP

[56] References Cited

U.S. PATENT DOCUMENTS

| | | | |
|---|---|---|---|
| 2,424,431 | 7/1947 | Booth | 403/132 |
| 3,211,483 | 10/1965 | Sullivan, Jr. | 403/140 |
| 3,343,857 | 9/1967 | Cislo | 403/140 X |
| 3,507,527 | 4/1970 | White | 403/140 |

FOREIGN PATENT DOCUMENTS

| | | | |
|---|---|---|---|
| 878147 | 9/1961 | United Kingdom | 403/135 |
| 1117351 | 6/1968 | United Kingdom | 403/135 |

*Primary Examiner*—Andrew V. Kundrat
*Attorney, Agent, or Firm*—Stevens, Davis, Miller & Mosher

[57] ABSTRACT

The ball joint for the suspension system of automobiles, in which as a load-supporting seat, a multi-layer material provided with the synthetic resin layer having self-lubricating ability and abrasion resistance is used on the surface of the back metal, while as an opposite seat to a ball stud, synthetic resin having self-lubricating ability and wear resistance is used, and constituted so as to keep securely load support applied on the ball head by both seats.

8 Claims, 20 Drawing Figures

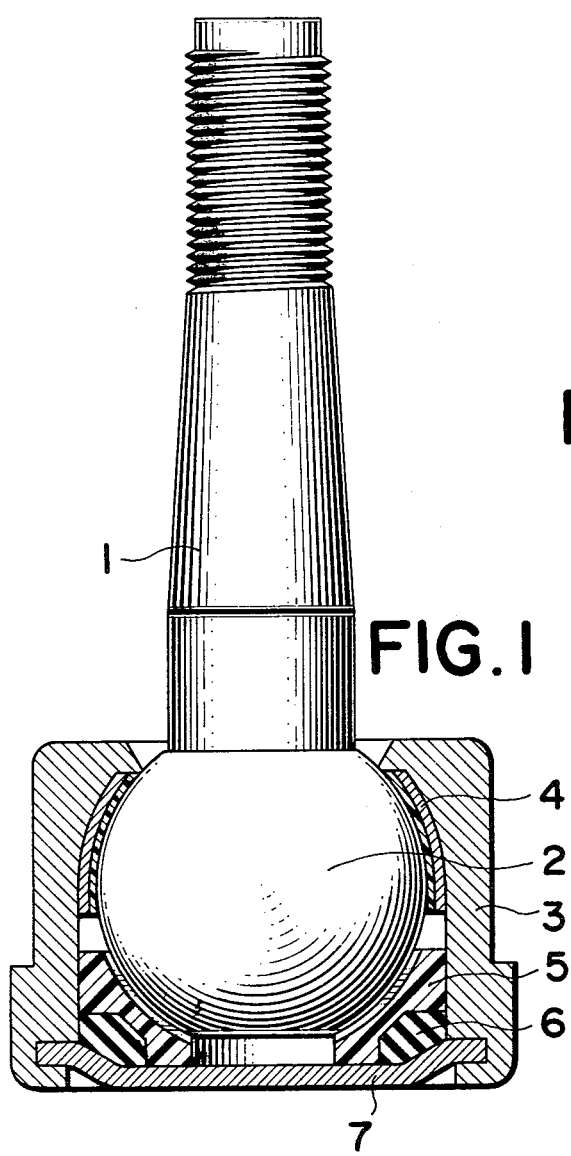
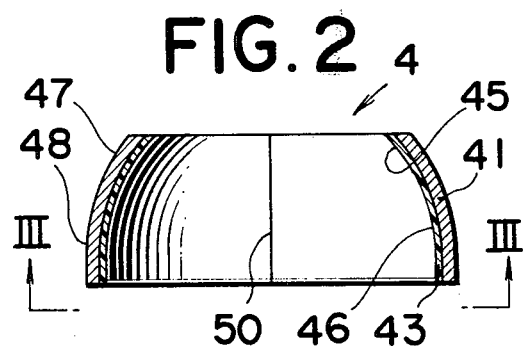
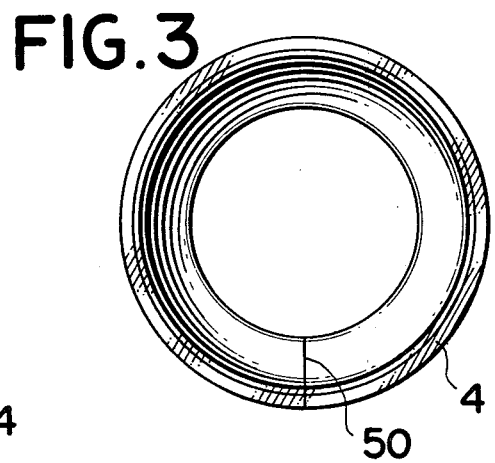
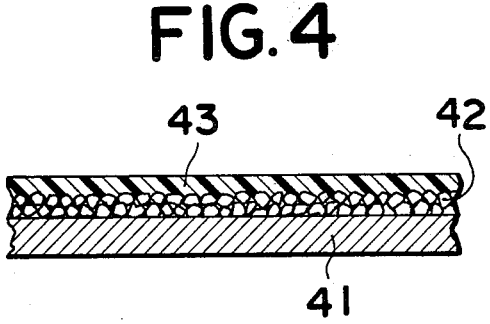
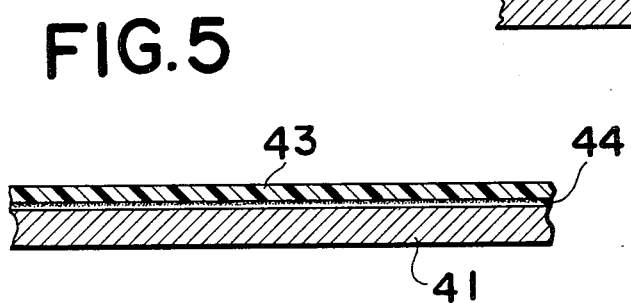

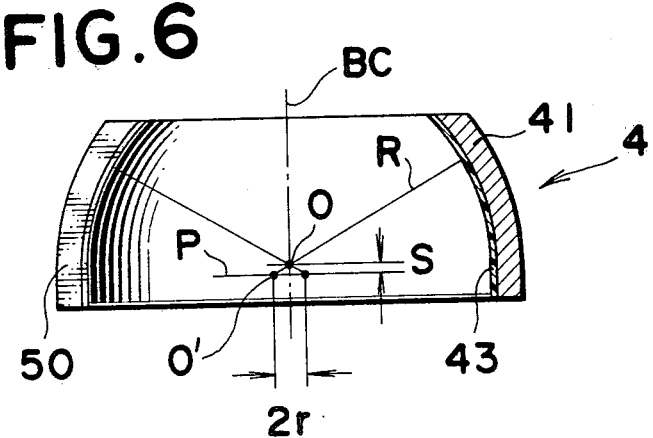
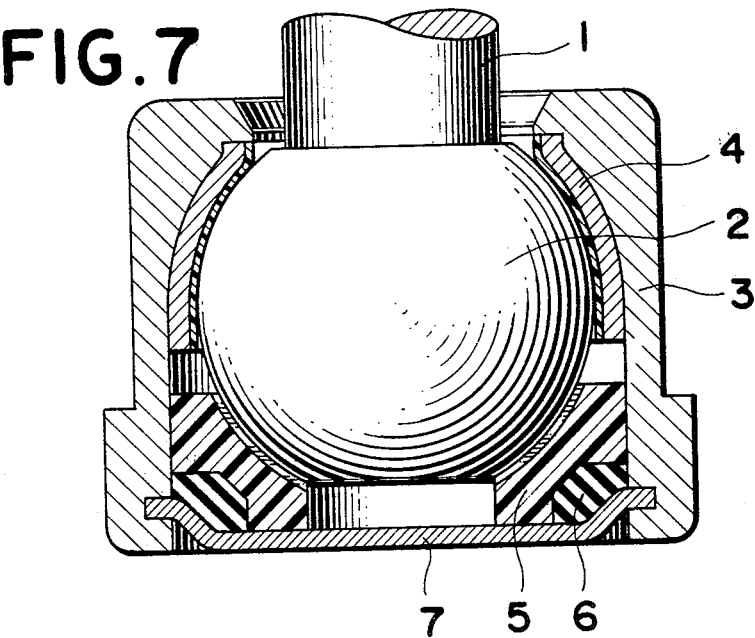
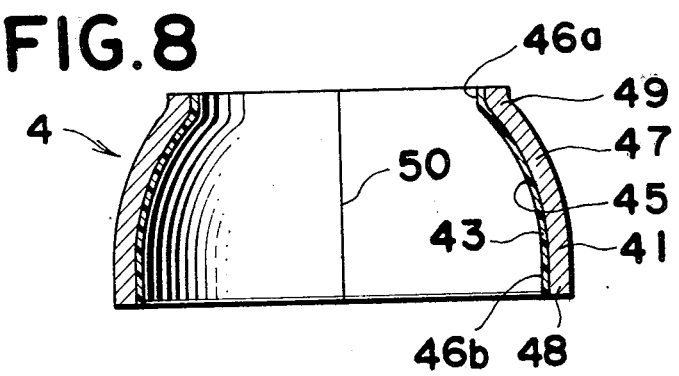

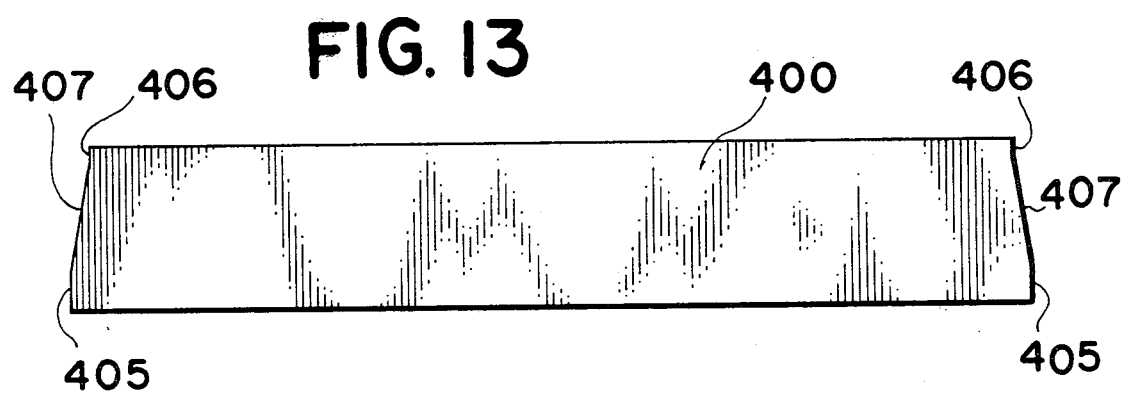
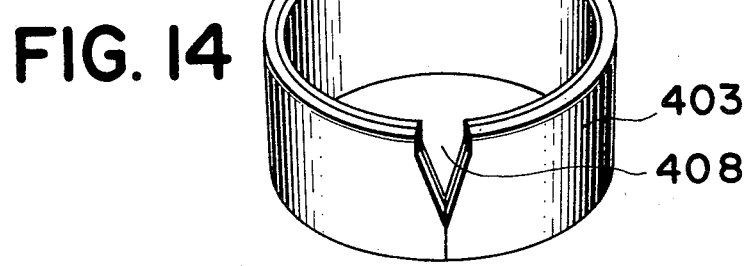
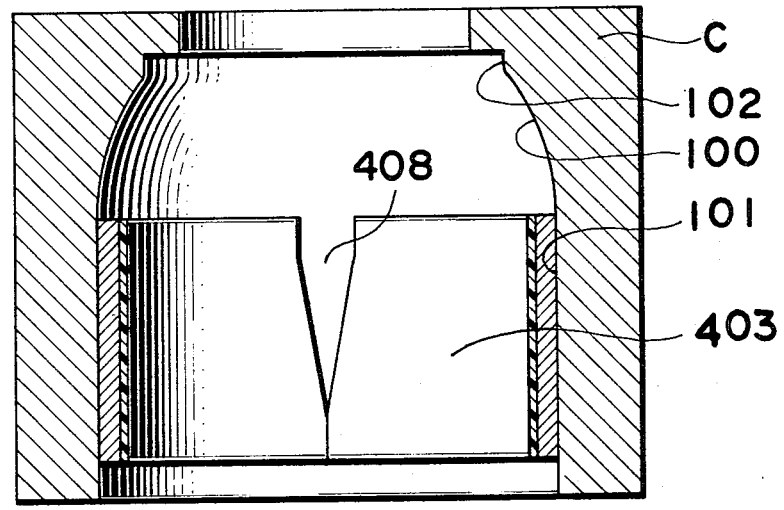
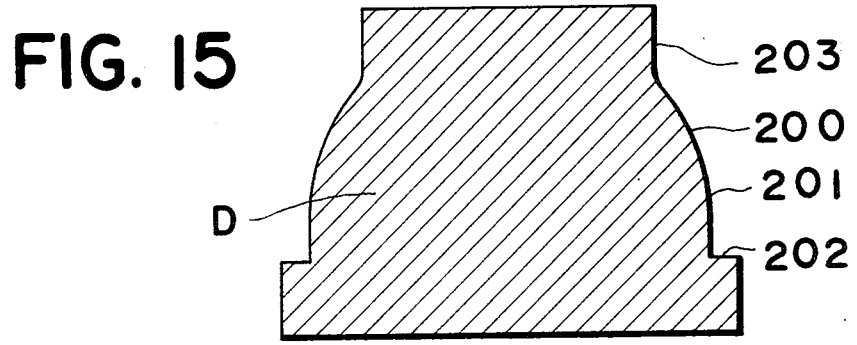

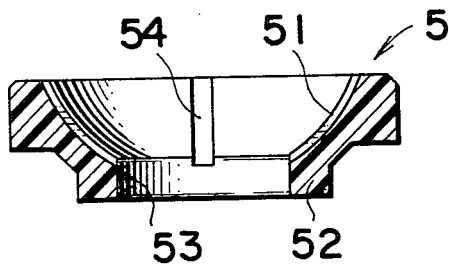
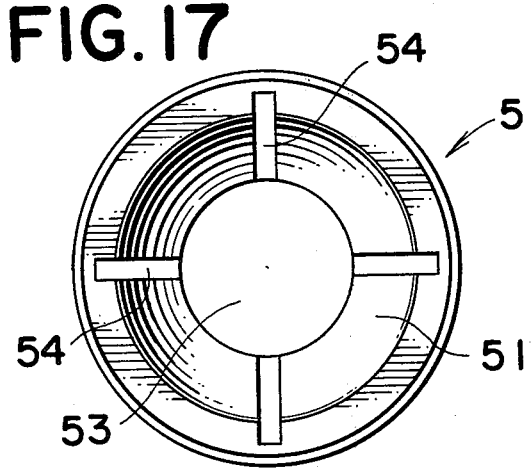
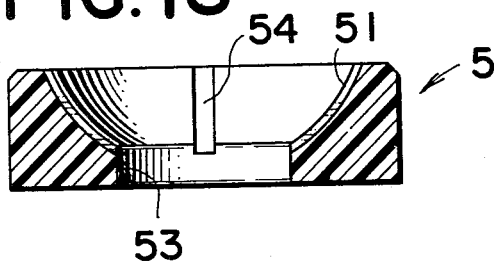
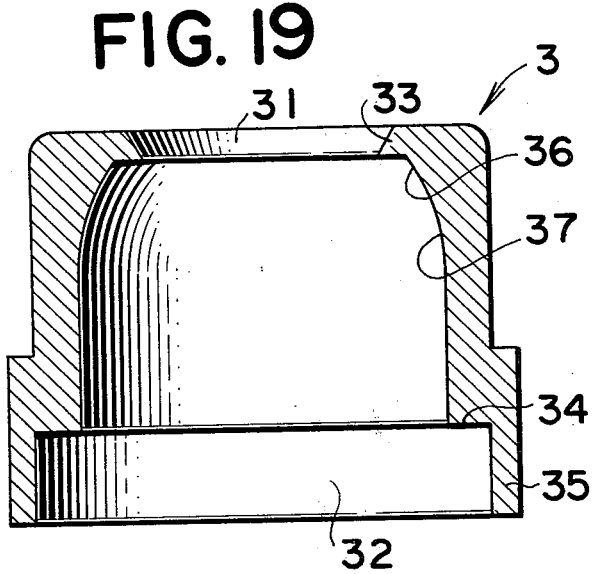
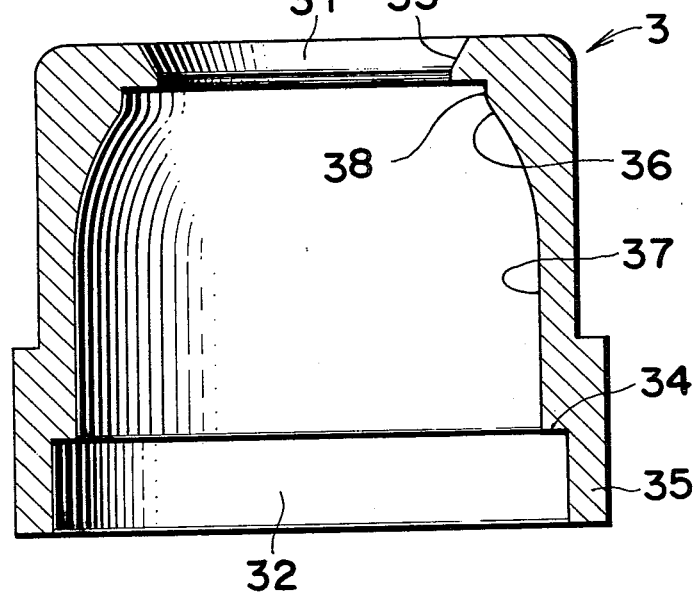

BALL JOINT AND A METHOD FOR MANUFACTURING THE BALL JOINT

BACKGROUND OF THE INVENTION

As a structure of ball joint for performing such function a metal sintering material has been used until now on the seat on the load-supporting side which supports the ball head, or synthetic resin materials such as polyethylene, polyurethane, or polyamide having elasticity and wear resistance have been used.

The former, however, has defects such as a torque increase under load and a seizuring in use, in contrast to its larger mechanical strength, while the latter may bring about a cold flow of the resin material, flowing out from the opening at which the ball stud extends.

SUMMARY OF THE INVENTION

A major object of the present invention is to provide a ball joint which can operate smoothly by decreasing a tilting torque and a rotating torque, and by absorbing or lightening a possible shock caused from the road surface and increase its mechanical strength.

Another object of the present invention is to provide a ball seat supporting a ball head of the ball stud, which consists of two portions, upper and lower, towards the axis of ball stud, and as an upper seat for supporting loads a multi-layer material formed by providing with the synthetic resin having self-lubricating ability and wear resistance on the surface of back metal such as steel is employed in order to fully utilize the synthetic resin's self-lubricating ability and wear resistance as well as to increase its mechanical strength by the back metal.

A further object of the present invention is to provide a ball joint which effectively prevents a torque increase and stress concentration by providing cylindrical surface portions continuing to the spherical surface portion at its top and bottom ends of the upper seat respectively.

A still further object of the present invention is to provide a ball joint which permits the ball head to contact with the spherical surface of the upper seat slidable enough at any time by positioning the spherical center of the upper seat functioning as a load-supporting seat separate by a small distance from the spherical center of the ball head.

Further, the present invention has a particular object which provides a method for manufacturing the ball joint.

According to the present invention, there is provided a ball joint which comprises a casing having a small opening and a large opening opposite to the small opening; a ball head housed in said casing; a ball stud protruding integrally from said ball head and extending through the small opening of said casing; an upper seat consisting of a multi-layer material formed by providing with a synthetic resin layer having self-lubricating ability and wear resistance on the surface of a back metal such as steel, the upper seat being formed so as to be fitted in and seat on said casing at the small opening side of said casing, and so as to fit and surround said ball head at its periphery adjacent to the ball stud; a lower seat consisting of a synthetic resin having self-lubricating ability and wear resistance and being formed so as to fit and surround said ball head at its opposite periphery adjacent to the ball stud; and a closure plate for closing said large opening of the casing; wherein the ball joint is constituted so as to enable the upper seat and lower seat to support a load securely against the casing and ball head when a tensile load is applied to the ball stud.

In the ball joint to which the present invention relates, a ball seat which is divided into two portion, upper and lower, towards the axis of the ball stud is used for the ball seat which surrounds the ball head, and as a load bearing side seat a multi-layer material is used which is formed by providing with the synthetic resin layer having self-lubricating ability and wear resistance on the surface of back metal such as steel, further the synthetic resin layer functions as a sliding surface against the ball head, accordingly the synthetic resin layer can play its ability fully by also the reinforcement of the back metal, and absorb or lighten a possible shock caused from the road surface.

Further, according to the present invention, there is provided a method for manufacturing a ball joint which comprises the steps of forming a cylindrical bush by bending such a flat plate strip consisting of a multi-layer material as a space is formed at a butt portion when both ends of the plate are confronted each other in a cylindrical state, inserting the cylindrical bush into a mold having a spherical surface portion and a cylindrical surface portion continuing to the spherical surface portion on tis inside peripheral surface, inserting a punch having a spherical surface portion, a cylindrical surface portion continuing to the spherical surface protion and a shoulder portion continuing to the spherical surface portion and a shoulder portion continuing to the sylindrical surface portion on its outside peripheral surface into the inside of the cylindrical bush, pressing the punch to make the cylindrical bush plastically deform, and incorporating the deformed upper seat in the casing.

According to the method, to produce the upper seat from the flat plate strip can attain a better yeild than to make it through the deep drawing process, and effectively prevent the wasting of materials.

The other objects, features and advantages of the present invention will become more apparent from the following detailed description given with reference to the appended drawings, in which:

FIG. 1 is a longitudinal sectional view of the ball joint of the present invention;

FIG. 2 is a longitudinal sectional view of the upper seat;

FIG. 3 is a view looked from the line III—III of FIG. 2;

FIGS. 4 and 5 are longitudinal sectional views of multi-layer material constituting the upper seat;

FIG. 6 is a longitudinal sectional view relating to another embodiment of the inside spherical surface portion of the upper seat, showing the state which is cut along the butt portion of the upper seat;

FIG. 7 is a longitudinal sectional view relating to another embodiment of the ball joint of the present invention;

FIG. 8 is a longitudinal sectional view of the upper seat of the ball joint shown in FIG. 7;

FIGS. 13 to 15 are schematic views showing the manufacturing process of the upper seat in the second embodiment;

FIG. 16 is a longitudinal sectional view of the lower seat;

FIG. 17 is a plan view of the lower seat;

FIG. 18 is a longitudinal sectional view of the lower seat showing another embodiment;

FIG. 19 is a longitudinal sectional view of the casing for the ball joint in the first embodiment; and FIG. 20 is a longitudinal sectional view of the casing of the ball joint in another embodiment.

DETAILED DESCRIPTION OF THE INVENTION

Figure 9:
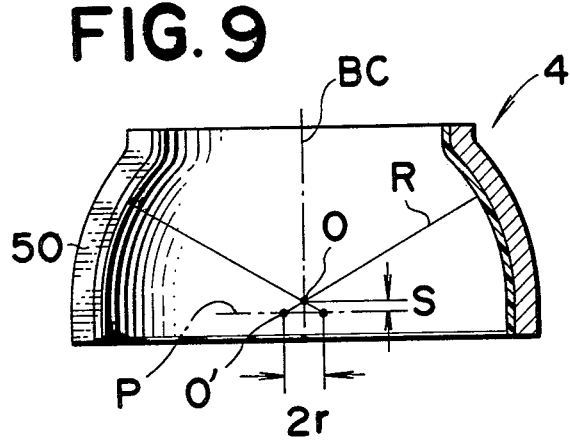
FIG. 9 is the same longitudinal sectional view as FIG. 6.

In FIG. 1, 1 is a ball stud integrally protruding from a ball head 2 in its one end and the ball head 2 is housed in a casing 3. The ball head 2 is surrounded and supported in the casing 3 by means of an upper seat 4 and a lower seat 5 being divided towards the axis of the ball stud. The lower seat 5 is surrounded by a rubber member 6, and a closure plate 7 closes an opening.

The upper seat 4 surrounding the ball head 2 at the periphery adjacent the ball stud 1 supports the body weight, and plays the role of the load bearing side seat which bears the tensile load applied on the ball stud 1 by a possible shock caused from the surface condition of roads, accordingly materials having superior self-lubricating ability (coefficient of low friction), wear resistance, and mechanical strength should be chosen. In the present invention, as shown in FIG. 4, a sintered layer 42 such as bronze alloy is formed on the surface of a back metal 41 such as steel, and on the sintered layer 42, a synthetic resin layer 43 having self-lubricating ability and wear resistance, such as polytetrafluoroethylene, polyacetal, or polyacetal containing lubricant, polyethylene, or polyethylene containing lubricant, or polybutyeleneterephthalete (PBT) is impregnated, and therefore a multi-layer material is obtained. The multi-layer material in which the synthetic resin layer 43 functions as a sliding surface against the ball head 2 constitutes the upper seat 4. As shown in FIG. 5, on the surface of the back metal 41 such as steel, the synthetic resin layer 43 having self-lubricating ability and wear resistance, such as polytetrafluoroethylene, polyacetal or polyacetal containing lubricant, polyethylene or polyethylene containing lubricant, or polybutyleneterephthalete (PBT) is bonded by means of an adhesive agent 44, and then an other multi-layer material is obtained. In the present invention this multi-layer material may also constitute the upper seat 4.

Such a structure of the upper seat 4 of the multi-layer material permits the synthetic resin layer 43 to utilize fully its self-lubricating ability and wear resistance and to increase greatly its mechanical strength which can not be attained by the synthetic resin itself, accordingly the objects of the present invention are satisfied.

As shown in FIG. 2, in the structure of the upper seat 4 consisting of the multi-layer material, a spherical surface portion 45 is formed to surround the ball head 2 in its inside peripheral surface, and the spherical surface portion 45 is continued to a cylindrical portion 46 at its end.

On the outside peripheral surface of the upper seat 4, like on the inside peripheral surface of the seat, a spherical surface portion 47 and a cylindrical surface portion 48 which is continued to the portion 47 are formed. That is, the cylindrical portion 46 of the resin layer 43 extending beyond the equator portion of the ball head 2 is also reinforced by the back metal 41, accordingly the deformation of the resin layer 43 is prevented, and stress loaded on the resin layer 43 is dispersed on the back metal and the breakage of the upper seat 4 can be prevented.

When the cylindrical portion 46 fits the ball head 2, an end of the cylindrical portion extends beyond the equator portion of the ball head 2. If it does not constitute like this, the upper seat 4 alone tends to support the load applied to the ball stud 1 at right angle to the axis of the stud, consequently the compressive force applied to the upper seat is increased. When operation is carried out under such a condition, by such a wedge action as the ball head 2 tends to enter a space between the upper seat 4 and the lower seat 5 an outstanding abrasion takes place on the upper seat 4, and the stress is concentrated abnormally on the inside peripheral surface portion on its lower ends of the upper seat 4. However, by means of the construction aforementioned, a disadvantage such as causing a breakage of the upper seat 4 is eliminated.

As stated above, the spherical surface portion 45 formed on the inside peripheral surface of the upper seat 4 is formed into a concave spherical surface which contacts closely and slidably with the ball head 2. That is, the spherical center of the ball head 2 and the spherical center of the spherical surface portion 45 are formed so that both may coincide.

Usually, in the ball joint when assembling, it is practically very difficult to embrace the ball head uniformly on the inside peripheral surface of the ball seat because of the effect of working tolerance on the outside spherical surface of the ball head, the inside spherical surface of the ball seat on which the ball head is fitted, and the inside spherical surface of the casing on which the ball seat is fitted and seated.

The inventors have already confirmed the fact that if the ball head comes in contact with the ball seat slidably with its opening edge as a load point, increased operating torque and the breakage of the seat may result in. Accordingly, it is more desirable that the upper seat is formed as shown in FIG. 6. That is, the inside peripheral surface portion of the upper seat 4 shown in FIG. 6 is formed into a spindle-shaped concave surface. This spindle-shaped concave surface is obtained in such a manner as at a place under the spherical center O of the ball head (in the opposite direction to that of the ball stud protrudes) separated by a small spaces from the spherical center, a plane P crossing at right angle with the axis BC of the ball stud is assumed, on which a small circle is drawn with a radius r, with a intersection point of the stud axis BC against the plan P as its center, while a segment R placing its one end O' on the circumference of the small circle and extending its other end through the stud axis BC is assumed, then a curve which is drawn by making the end O' its center and by the tip of the segment R moving across the stud axis BC is obtained, and further by making the curve rotate 360 degrees around the stud axis. The ball head, as a result of being formed into such a concave surface is always supported slidably on the inside peripheral surface of the upper seat without slidable contact with the opening edge of the seat, therefore, the ability of the ball joint can be further improved, without ill effects mentioned above. However, the outside peripheral surface of the upper seat may be a spherical surface with a spherical center O of the ball head 2 as its center. In the drawings, 50 is a butt portion formed as stated below.

FIGS. 7 and 8 show another embodiment. In this embodiment, the upper seat 4 is different from one stated above. The spherical surface portion 45 is formed so as to surround the ball head 2 adjacent the ball stud 1 on its spherical surface, and one end of the spherical surface portion 45 continues to a cylindrical projected portion 46a, while the other end, to a cylindrical portion 46b. On the outside peripheral surface of the upper seat 4, like the inside peripheral surface, the spherical surface portion 47 is formed, andone end of the spherical surface portion 47 continues to a cylindrical portion 49, while the other end, to the cylindrical portion 48. Because the cylindrical projected portion 46a is formed in the upper seat 4, and the inside peripheral surface of the ball seat surrounding the ball head 2 is formed with the synthetic resin layer 43, even if the ball head is inclined, it keeps in contact with the synthetic resin layer 43 slidably, accordingly it operates smoothly. As the embodiment stated above the end of the cylindrical portion 48 in the upper seat 4 in this embodiment also extends beyond the equator portion of the ball head 2 when fitted the ball head 2. In this embodiment as shown in FIG. 9, the spherical center of the ball head and spherical center of the upper seat may be positioned so as to be spaced at a small distance each other. In this case, their configurations and effects of doing so are the same as those shown in FIG. 6. In this drawings, 50 is a butt portion which is formed as stated below.

Figure 11:
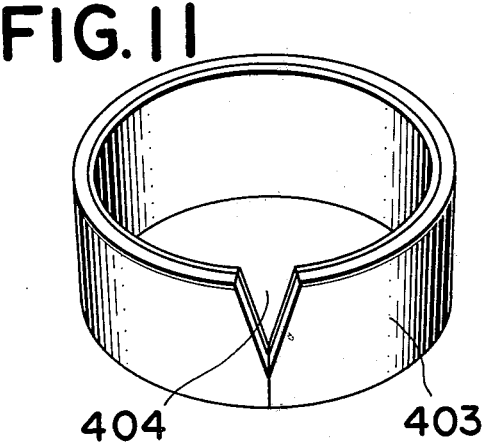
FIGS. 10 to 12 are schematic view showing the manufacturing process of the upper seat in the first embodiment.
Figure 10:
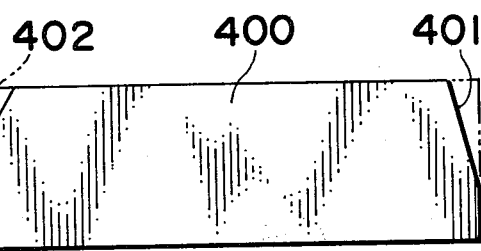
Figure 12:
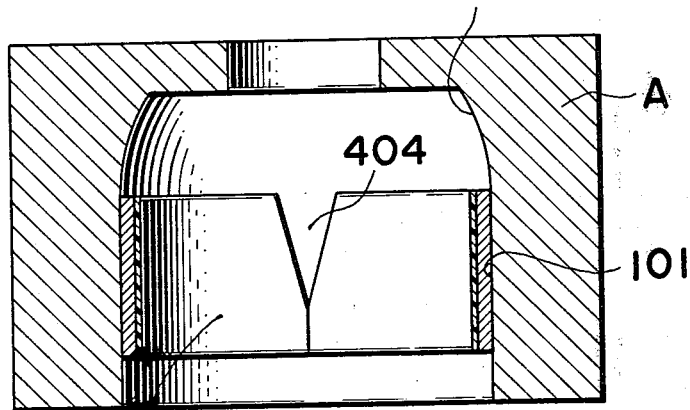

In the above two embodiments, the upper seat consisting of the multi-layer material may be formed through the ordinary drawing process. However, the following method is more preferable. FIGS. 10 through 12 show the manufacturing process in the first embodiment stated above.

The multi-layer material is worked into a flat plate strip 400, at one corner on each end a cut 401 is provided (FIG. 10). Instead of providing the cut 401 at both ends of the plate strip 400, a triangular cut 402 may be provided in the plate 400. Next, the flat plate 400 consisting of the multi-layer material is bent so as to make the synthetic resin layer 43 face inside to produce a cylindrical bush 403. At this time, the both ends of the flat plate strip 400 are butted each other, and at the butt portion a nearly triangular space 404 is formed (FIG. 11).

After bent into the cylindrical bush 403, this bush is inserted into a metal mold A having a spherical surface portion 100 on its inside peripheral surface, and a cylindrical surface portion 101 continuing to the spherical surface portion 100 (FIG. 12). After the cylindrical bush 403 is inserted into the metal mold A, a punch B having a spherical surface portion 200 on its outside peripheral surface, a cylindrical surface portion 201 continuing to the spherical portion 200, and a shoulder portion 202 is inserted to fit on the inside peripheral surface of the bush 403, and the peripheral edge portion of the cylindrical bush 403 is pushed and pressed by the shoulder portion of the punch B. The cylindrical bush 403 pressed by the punch B is deformed plastically along the inside peripheral spherical surface 100 of the metal mold A and the outside peripheral spherical surface 200 of the punch B, consequently the upper seat 4 as shown in FIGS. 2 and 3 is formed. At this time, as shown in FIG. 11 a nearly triangular space 404 produced at the time the cylindrical bush 403 was formed from the flat plate 400, disappears due to its plastic deformation from a cylindrical shape to a spherical surface shape, and the butt portion 50 is formed in the upper seat 4 (FIGS. 2 and 3).

FIGS. 13 through 15 show the manufacturing process under which the upper seat is formed in the second embodiment stated above. In this case, the process is substantially similar to that stated above. The multi-layer material is worked into the flat plate strip 400, both ends of which are cut so that a straight portions 405 and 406, and an inclining portion 407 between the straight portions are formed (FIG. 13). Then, the flat plate 400 consisting of the multi-layer material is bent so as to make the synthetic resin layer 43 face inside to produce a cylindrical bush 403. At this time, both ends of the flat plate 400 are butted each other, and at this butt portion, a nearly pentagonal space 408 is formed (FIG. 14). After bent into the cylindrical bush 403, this bush is inserted into a metal mold C having a spherical surface portion 100 on the inside peripheral surface portion and cylindrical surface portions 101, 102 respectively continuing to the spherical surface portion 100 (FIG. 15). After the cylindrical bush 403 is inserted into the metal mold C, a punch D having a spherical surface portion 200 on its peripheral surface, cylindrical surface portions 201, 203 respectively continuing to the spherical surface portions 200 and a shoulder portion 202 continuing to the cylindrical portion 201 is inserted and fitted on the inside peripheral surface of the bush 403, and the peripheral edge portion of the cylindrical bush 403 is pressed by the shoulder portion of the punch D. The cylindrical bush 403 depressed by the punch D is pressed along the inside peripheral spherical surface 100, the cylindrical portions 101, 102 of the metal mold C, then deformed plastically into the upper seat 4 as shown in FIG. 8. In case of this embodiment, the nearly pentagonal space 408 disappears due to the plastic deformation, and a butt portion 50 is formed as shown in FIG. 8.

The lower seat surrounding the end portion of the ball head 2 on the opposite side of the ball stud 1 supports closely the ball head 2 under a press by a rubber member stated below, to play its role to compensate for abrasion between the upper seat 4 and lower seat 5. The lower seat 5 comprises the synthetic resin materials having self-lubricating ability and wear resistance, for example, polyacetal or polyacetal containing lubricant, polyamide, polyethylene or polyethylene containing lubricant, polyurethane having elasticity besides properties stated above, and elastic polyester resin which is polyetherester or is obtained by mixing polyetherester with thermoplastic polyester resin such as polyethylene terephthalate, polybuthylene terephthalate, etc.

A concave spherical surface 51 whose structure is as shown in FIGS. 16 and 17, is formed to surround the spherical surface end of the ball head 2 on the opposite side of the ball stud 1, and on its back portion a projected portion 52 is formed. At the center of the concave spherical surface 51 a hole 53 is formed penetrating the projected portion 52, and on the concave spherical surface 51 few grooves 54 are formed to connect the peripheral portion of the concave spherical surface with the central hole 53. The grooves 54 are to be a reservoir of lubricant such as grease. These grooves are not always needed if the synthetic resin having self-lubricating ability is used, however, it is preferable to provide grooves for better lubricating ability.

For the lower seat 5, it is preferable to be pressed by the rubber member stated below, however, when the synthetic resin having elasticity as stated above is used, the lower seat 5 having a construction shown in FIG. 18 is used, and the rubber member stated below may be omitted.

As shown in FIG. 19 in the first embodiment, on the casing 3 in which the ball head 2, the upper seat 4 surrounding the ball head 2 and the lower seat 5 are housed, at its top end a small opening 31 through which the ball stud 1 extends, and a large opening 32 at the opposite end to the small opening 31 are formed, and at the end of periphery of the small opening 31 a seat stop 33 extending radially inwardly to the axis of the ball stud 1 and at the end periphery of the large opening 32 a lip portion 35 which will be inwardly swaged against a shoulder portion 34 when assembling, are formed respectively. On the inside peripheral surface of the casing 3, from its small opening 31 to the ball head equator portion a spherical surface portion 36 meeting on the outside peripheral spherical surface of the upper seat 4 is formed to make the upper seat fit and seat on it, and on the spherical surface portion 36, from its end to the large opening portion 32 a cylindrical surface portion 37 is formed. In the second embodiment as shown in FIG. 20, a cylindrical surface portion 38 is formed between the spherical surface portion 36 and the seat stop 33, and the other forms are similar to those in the first embodiment.

The rubber member 6 is positioned so as to surround the projected portion 52 in the lower seat 5. The rubber member 6 brings the lower seat 5 into closely contact with the surface of the ball head 2 by its elasticity to obtain a required operating torque with the ball joint, and plays its role to compensate automatically for a possible wear caused between the upper seat 4 and lower seat 5. FIGS. 1 and 7 show concrete embodiments of the present invention in which the urbber member 6 is used, and a spring may be used in place of the rubber member. Or, the rubber member 6 and the spring may be omitted by constituting the lower seat with the elastic synthetic resin as stated above.

The closure plate 7 is for closing the large opening 32 of the casing. The closure plate 7 makes the rubber member 6 positioned between the lower seat 5 and the closure plate 7 press and fit to the lower seat 5 under pressure.

The ball joint constituted as stated above may be assembled as follows. At first, the upper seat 4 is inserted into the casing 3, and the top end of the upper seat 4 is caused to contact with the seat stop 33 of the casing 3, then the outside spherical surface portion 47 of the upper seat 4 is fitted and seated on the inside peripheral surface portion 36 of the casing 3. Next, the ball head 2 adjacent the ball stud 1 is fitted to the inside spherical surface portion 45 of the upper seat 4. Then, the concave spherical surface 51 of the lower seat 5 is fitted to the other end portion of the ball head 2 one end portion of which is surrounded with the upper seat 4, and the rubber member 6 is provided so as to surround the projected portion 52 of the lower seat 5.

After that, the closure plate 7 is provided to press the rubber member 6 so as to mkae its peripheral edge contact with the inside peripheral surface shoulder portion 34 of the casing, and the closure plate is fixed by swaging the lip portion 35 of the casing 3, accordingly relative positions among the ball head 2, the upper seat 4, the lower seat 5, and the casing 3 are established, and the assembling is completed.

What is claimed is:

1. A ball joint comprising a casing having a small opening and a large opening opposite to the small opening; a ball head housed in said casing; a ball stud protruding integrally from said ball head and extending through the small opening of said casing; an upper seat consisting of a multi-layer material formed by providing with a synthetic resin layer having self-lubricating ability and wear resistance on the surface of a back metal such as steel, the upper seat being formed so as to be fitted in and seated on said casing at the small opening side of said casing, and so as to fit and surround said ball head at its periphery adjacent to the ball stud; a lower seat consisting of a synthetic resin having self-lubricating ability and wear resistance and being formed so as to fit and surround said ball head at its opposite periphery adjacent to the ball stud; and a closure plate for closing said large opening of the casing; wherein said upper seat is provided with a peripheral spherical surface portion and two cylindrical surface portions continuing to the peripheral spherical portion at both its ends and the ball joint is constituted so as to enable the upper seat and lower seat to support a load securely against the casing and ball head when a tensile load is applied to the ball stud.

2. A ball joint as claimed in claim 1, wherein the spherical center of the ball head and the spherical center of the spherical surface portion in the upper seat coincide with each other.

3. A ball joint as claimed in claim 1, wherein the spherical center of the ball head and the spherical center of the spherical surface portion in the upper seat are positioned at a small distance from each other.

4. A ball joint as claimed in claims 2 or 3, wherein the synthetic resin layer having self-lubricating ability and wear resistance is impregnated on the sintered layer formed on the surface of the back metal.

5. A ball joint as claimed in claims 2 or 3, wherein the synthetic resin layer having self-lubricating ability and wear resistance is bonded on the back metal by means of an adhesive agent.

6. A ball joint comprising:
 a casing having a small opening and a large opening opposite to the small opening;
 a ball head housed in said casing;
 a ball stud protruding from said ball head and extending through the small opening of said casing;
 an upper seat consisting of a multi-layer material which is formed by providing with a synthetic resin layer having self-lubricating ability and wear resistance impregnated in a sintered layer formed on the surface of a back metal such as steel, the upper seat being formed so as to be fitted in and seated on said casing at the small opening side of said casing, and so as to fit and surround said ball head at its periphery adjacent to the ball stud;
 a lower seat consisting of a synthetic resin having self-lubricating ability and abrasion resistance and being formed so as to fit and surround said ball head at its opposite periphery adjacent to the ball stud; and
 a closure plate for closing said large opening of the casing; wherein the upper seat has a spherical surface portion and a cylindrical surface portion extending toward the large opening and with its terminal cylindrical surface spaced from the surface of the ball continuing to this spherical surface portion, and the ball joint is constituted so as to enable the upper seat and lower seat to support a load securely against the casing and ball head when a tensile load is applied to the ball stud.

7. A ball joint as claimed in claim 6, wherein the spherical center of the ball head and the spherical center of the spherical surface portion in the upper seat coincide with each other.

8. A ball joint as claimed in claim 6, wherein the sphericals center of the ball head and the spherical center of the spherical surface portion in the upper seat are positioned at a small distance from each other.

* * * * *